United States Patent

Gustafson et al.

Patent Number: 5,886,257
Date of Patent: Mar. 23, 1999

[54] AUTONOMOUS LOCAL VERTICAL DETERMINATION APPARATUS AND METHODS FOR A BALLISTIC BODY

[75] Inventors: Donald E. Gustafson, Wayland, Mass.; David J. Lucia, Colorado Springs, Colo.

[73] Assignee: The Charles Stark Draper Laboratory, Inc., Cambridge, Mass.

[21] Appl. No.: 675,734

[22] Filed: Jul. 3, 1996

[51] Int. Cl.$^6$ .................................................. G01C 21/00
[52] U.S. Cl. ................. 73/178 R; 244/3.15; 244/171; 364/459; 364/424.013
[58] Field of Search ................. 244/3.15, 3.21, 244/171, 175, 180, 183, 194, 79; 73/178 R; 364/453, 454, 459, 424.012, 424.013, 424.021, 424.023, 559, 566

[56] References Cited

U.S. PATENT DOCUMENTS

| | | | |
|---|---|---|---|
| 2,967,031 | 1/1961 | Chase et al. | 244/3.15 |
| 3,596,523 | 8/1971 | Clark | 74/5.6 |
| 3,699,316 | 10/1972 | Lopes, Jr. | 364/453 |
| 3,984,072 | 10/1976 | von Pragenau et al. | 244/169 |
| 4,038,527 | 7/1977 | Brodie et al. | 235/150.25 |
| 4,123,019 | 10/1978 | Amberntson | 244/3.2 |
| 4,262,861 | 4/1981 | Goldstein | 244/3.2 |
| 4,267,736 | 5/1981 | Westbeck | 74/5.22 |
| 4,343,035 | 8/1982 | Tanner | 364/453 |
| 4,470,562 | 9/1984 | Hall et al. | 244/3.2 |
| 4,530,476 | 7/1985 | Thurber, Jr. et al. | 244/3.21 |
| 4,542,870 | 9/1985 | Howell | 244/3.15 |
| 4,790,493 | 12/1988 | Schwarzkopf et al. | 244/3.21 |
| 4,914,598 | 4/1990 | Krogmann et al. | 364/424.021 |
| 5,349,855 | 9/1994 | Bernstein et al. | 73/505 |
| 5,360,184 | 11/1994 | Johnson | 244/3.2 |
| 5,394,242 | 2/1995 | Porter | 356/350 |
| 5,398,111 | 3/1995 | Cardarelli | 356/350 |
| 5,420,684 | 5/1995 | Carroll | 356/350 |
| 5,438,231 | 8/1995 | Khoshnevisan et al. | 310/321 |
| 5,452,869 | 9/1995 | Basuthakur et al. | 244/169 |
| 5,496,436 | 3/1996 | Berstein et al. | 156/628.1 |

OTHER PUBLICATIONS

Weinber et al. (1994) *AIAA* Paper 94–3687–CP.
Barbour et al. (1992) *AIAA* Paper 92–4414–CP.
Deyst et al. (1990) *Aerospace America* 28: 16–19.
Elwell (1991) *Conference Proceedings–Symposium Gyro Technology* (Abstract).
Beardmore (1993) *IEE Colloquium on 'Microengineering—the Future!'* (Abstract).

*Primary Examiner*—Hezron Williams
*Assistant Examiner*—Richard A. Moller
*Attorney, Agent, or Firm*—Lappin & Kusmer LLP

[57] ABSTRACT

Three rate gyros are mounted to a ballistic body to provide an autonomous navigation system. A roll gyro, a yaw gyro and a pitch gyro are rigidly fixed to the ballistic body. Each gyro is arranged to be responsive to a roll rate about an input axis that is substantially orthogonal to any other gyro. The roll-rate gyro has its input axis aligned parallel to the body spin axis. An on-board processor utilizes recursive Kalman-filtering to determine the roll angle, i.e., the local vertical direction, from the gyro outputs.

25 Claims, 3 Drawing Sheets

AUTONOMOUS LOCAL VERTICAL DETERMINATION APPARATUS AND METHODS FOR A BALLISTIC BODY

BACKGROUND OF THE INVENTION

It is desirable to actively guide certain ballistic bodies over the earth's surface. By way of example, a gun-fired artillery shell follows a ballistic trajectory and is sometimes accompanied by a complex guidance, navigation and control system that attaches, at least in part, to the shell's body to guide the shell to the desired target. Such guidance systems require the local vertical direction of the body along and during the ballistic trajectory. The local vertical direction generally corresponds to the angle between the body's velocity vector and the plane containing the velocity vector and the earth's gravitational vector.

In the prior art, such local vertical systems typically include either optical sensors or accelerometers. One prior art optical sensor system, for example, has a plurality of optical sensors mounted at intervals around the circumference of a spinning ballistic projectile, such as an artillery shell. A series of ground-based lasers are set at selected points near the trajectory's ground track to operate in conjunction with the on-board optical sensors. These lasers generate beams which follow the shell in flight and—as the shell's ballistic body spins about its body spin axis—the on-board optical sensors detect the beams. The detected laser beam information is then used in conjunction with the known positions of the ground-based lasers to derive the local vertical direction of the shell in body coordinates.

There are several disadvantages of the prior art optical sensor local vertical system. First, the system is not autonomous because it operates only in conjunction with on-ground instrumentation, e.g., the lasers. Second, the on-ground laser network must be trained and controlled on the body during flight, which requires complex electro-mechanical and sighting assemblies. Further, the on-ground instrumentation is typically expensive and is not always available, e.g., in the middle of enemy territory.

One prior art accelerometer local vertical system, for example, has two accelerometers with mutually orthogonal input axes, each of which is orthogonal to the body spin axis. These accelerometers are used to measure the lateral accelerations induced in a spinning artillery shell which flies at a lateral angle-of-attack, known as the "yaw of repose." These lateral accelerations, including their amplitudes and directions in local coordinates, e.g., down, East and North, are then predicted based upon apriori knowledge of the aerodynamic coefficients and the ballistic trajectory. The lateral accelerations can then be used to calculate the local vertical direction in body coordinates.

There are several disadvantages of the prior art accelerometer-based local vertical system. First, aerodynamic effects such as wind gusts introduce perturbations in the lateral accelerations which corrupt the estimate of the local vertical direction. Second, the lateral accelerations induced by the "yaw of repose" are often of small amplitude, and therefore yield relatively small signal-to-noise ratios, reducing the accuracy to which local vertical direction can be determined.

It is, accordingly, an object of the invention to provide apparatus for autonomously determining the local vertical direction of ballistic bodies along a trajectory without the use of accelerometers or optical sensors.

Another object of the invention is to provide a local vertical system which reduces and/or removes the problems described above in connection with the prior art.

Yet another object of the invention is to provide methodology for determining a local vertical direction of a ballistic body without required on-ground assistance and without required use of accelerometers.

Still another object of the invention is to provide apparatus and methods which provides the local vertical direction of a spinning or non-spinning projectile and with increased accuracy.

These and other objects will become apparent in the description which follows.

SUMMARY OF THE INVENTION

In one aspect, the invention provides an autonomous navigation system that operates independently on a ballistic body to determine local vertical direction, corresponding to the body roll angle relative to the local vertical plane. A roll gyro, a yaw gyro and a pitch gyro are rigidly fixed to the ballistic body, and each gyro is responsive to a roll rate about an input axis that is substantially orthogonal to any other gyro. The roll-rate gyro is further arranged to have its input axis aligned parallel to the body spin axis. An on-board processor connects to the gyros so as to extract rate information which is used to estimate the body roll angle.

In accord with the invention, the preferred rate gyro includes those strap-down micromechanical gyros such as described in U.S. Pat. Nos. 5,360,184; 5,349,855; and 5,496,436, each of which is assigned to the assignee of the present invention and each of which is hereby incorporated by reference. Other gyros may be used with the invention.

In another aspect, the on-board processor determines gravity turn information based upon rate information from each gyro. The on-board processor can further (a) determine a total measured rotational rate vector in body coordinates; and/or (b) extract gravity turn information from a total measured rotational rate vector in body coordinates.

In still another aspect, the on-board processor has a filter which improves the roll angle accuracy by filtering spurious rotations generated by aerodynamics. Typically, the filtering and process estimation steps of the on-board processor are recursive in nature. Kalman filtering is particularly desirable in accord with the invention.

In another aspect, the filtering steps include the estimation of a plurality of states. The first and second states derive from the roll gyro. The first state is representative of the sine of the body roll angle relative to a local vertical plane, and the second state is representative of the cosine of the body roll angle relative to the local vertical plane.

The pitch gyro of the invention is generally constructed and arranged so as to generate a pitch output signal that is substantially proportional to gravity turn rate and the first state. Likewise, the yaw gyro of the invention is generally constructed and arranged to generate a yaw output signal that is substantially proportional to gravity turn rate and the second state.

In a preferred aspect, the third and fourth states are derived from non-zero spin rates about the body spin axis. In the event that the spin rate is substantially zero, the on-board processor preferably de-emphasizes or neglects the third and fourth states.

The invention also provides a method for determining the roll angle of a ballistic body of the type having a body spin axis, including the steps of: sensing roll, yaw and pitch rates of the body, the roll rate corresponding to rotation about the body spin axis at a measurement time; recursively estimating a current gain state based upon (a) a covariance of state estimation errors prior to the measurement time, and (b) a covariance of state estimation errors after the measurement time; and applying the current gain state to a measurement residual to determine the local vertical direction.

The invention thus provides several advantages over the prior art. First, there is no need for apriori knowledge of the attitude state, since only on-board rate gyros are utilized. Second, the invention provides local vertical direction even when the ballistic body is non-rotating, corresponding to a body spin rate of zero. Other prior art guidance systems require rotating kinetics to calculate or gather information needed for local vertical direction.

Further, the filtering techniques described herein reduce the errors in local vertical direction and/or roll angle by statistical averaging and optimal filter techniques, improving the accuracy of the local vertical direction.

The techniques described herein are also relatively accurate as compared to the prior art. Simulations have shown that local vertical estimation errors from current micromechanical rate gyros are less than about five to ten degrees throughout the ballistic trajectory. This accuracy is adequate for all or nearly all guided shell applications.

In addition, the invention is less cumbersome than, for example, the optical sensor guidance systems of the prior art, which require extensive ground support lasers. Further, the rate gyros of the invention are less sensitive to wind gusts, as compared to prior art accelerometer-based guidance systems, and are thus more operationally robust. The inertial rate gyro sensors of the invention are also more directly correlated to local vertical direction as compared to accelerometers which are influenced by altitude, velocity, spin rate and aerodynamics. The methods of the invention do not require initialization of a known initial "start" condition, as is commonly required in the prior art, and which is commonly lost due to the prior art's inability to follow the kinetics generated at launch. Finally, the guidance systems of the invention can operate at any time of day or night, independent of weather conditions, because only inertial sensors are used.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1:
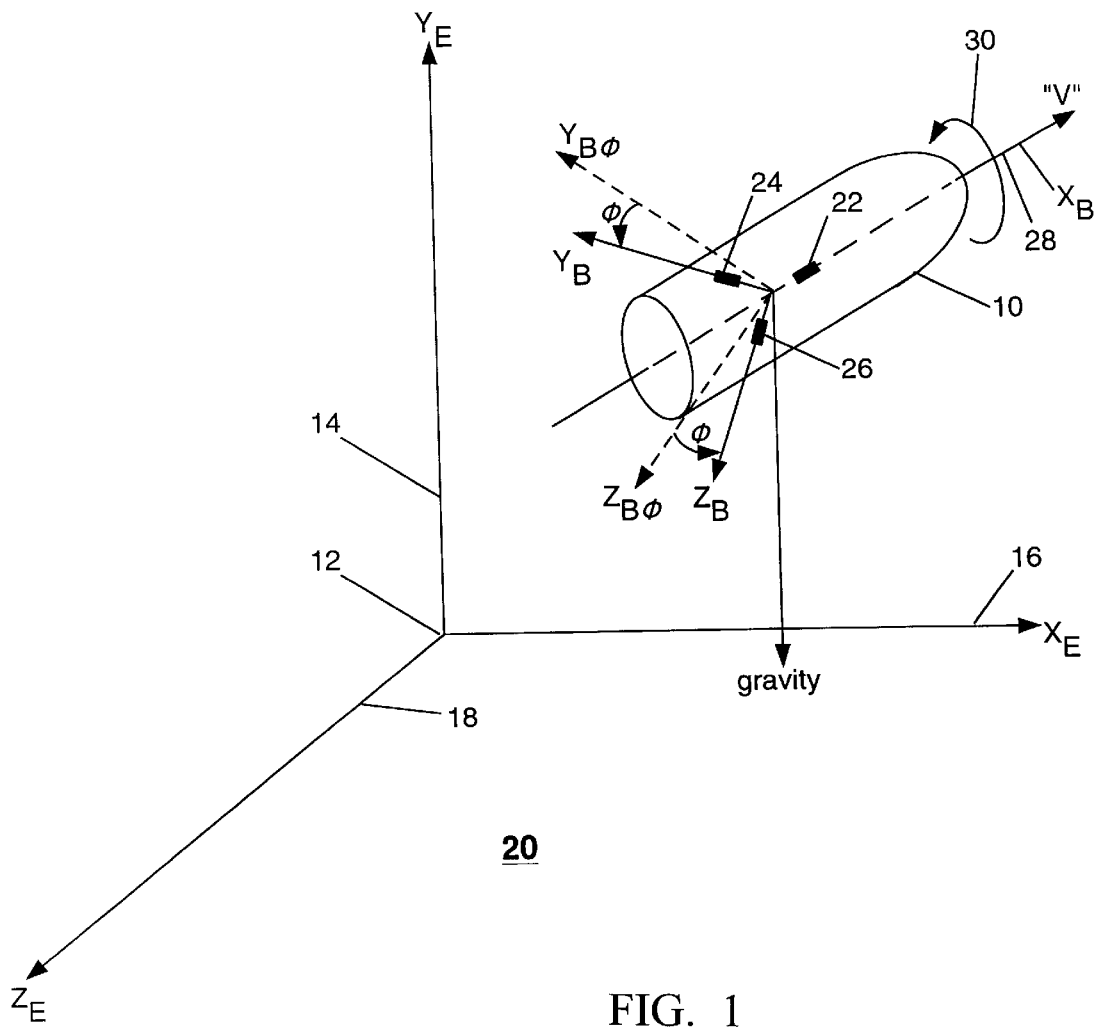
FIG. 1 illustrates a ballistic body and associated gyro operational coordinates in a trajectory over the earth, in accord with the invention.

FIG. 1 illustrates a ballistic body 10 relative to a fixed Cartesian coordinate frame 12 representative of earth. More particularly, in coordinate frame 12, axis $Y_E$ 14 represents the local vertical direction which is aligned with the gravitational vector 11 acting on the body 10; and axes $X_E$ and $Z_E$ 18 form a plane 20 that approximates the earth's surface.

In accord with the invention, three rate gyros 22, 24 and 26 are mounted to the body 10 to provide rotational rate information along three orthogonal axes. Each rate gyro 22, 24 and 26 has an input axis that is orthogonal to the input axis of every other rate gyro. Roll gyro 22 has an input axis that aligns with the body's spin axis 28 (note that axis 28 also corresponds to the instantaneous forward velocity vector "V" of the body's trajectory over the earth's surface). Gyro 22 is thus responsive to the body's rotation 30 about the spin axis 28 to provide roll rate information, i.e., the roll velocity, of the body 10.

The other two rate gyros 24, 26 are lateral gyros which measure, respectively, pitch and yaw information representative of the body's pitch and yaw rotational rates: pitch gyro 24 has an input axis that is orthogonal to rate gyros 22 and 26 and is responsive to rotational velocities to provide the pitch rate of the body 10; and yaw gyro 26 has an input axis that is orthogonal to rate gyros 22 and 24 and is responsive to rotational velocities to provide yaw rate of the body 10.

FIG. 1 also illustrates the body frame $X_B$, $Y_{B0}$ and $Z_{B0}$, which corresponds to local body coordinates with zero roll angle. Body frame $X_B$, $Y_B$ and $Z_B$, on the other hand, corresponds to local body coordinates after rotating-through roll angle $\Phi$.

Figure 2:
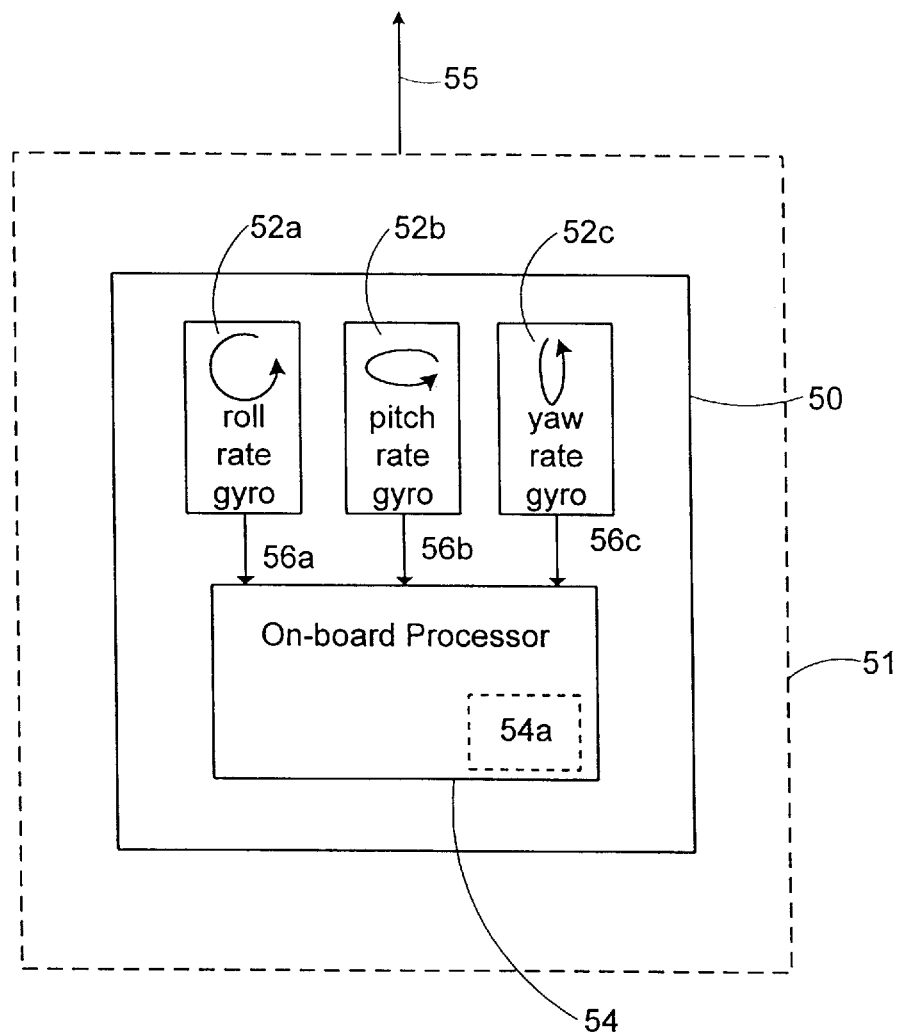
FIG. 2 shows a system, constructed according to the invention, for determining local vertical direction from a ballistic body.

FIG. 2 shows a system 50, constructed according to the invention, for determining local vertical direction of a ballistic body, here illustrated by outline 51. The system 50 includes three rate gyros 52a, 52b and 52c that are mounted to the body 51 in a ballistic trajectory 55, such as gyros 22, 24, 26 of FIG. 1 attached to body 10. As above, gyros 52a–52c are rate gyros that are arranged with three orthogonal and mutually exclusive input axes. Similar to gyro 22, roll gyro 52a provides real-time roll rate information of the body 51. Similar to gyros 24 and 26, respectively, pitch gyro 52b provides real-time pitch rate information and yaw gyro 52c provides real-time yaw rate information of the body 51.

System 50 also includes an onboard processor 54 that connects to each of the gyros 52a–52c through output lines 56a–56c, respectively. Processor 54 is "on-board" because it physically resides on or with the ballistic body 51. That is, the processor 54 is attached to, mounted on, or made integrally with or within the body 51. The processor 54 and the three gyros thus formulate an autonomous local vertical system which does not require ground-based support and/or processing assistance to determine the local vertical direction.

In operation, body 51 travels through the air along trajectory path 55, and each of the rate gyros 52a–52c generates a real-time signal indicative of an inertial, rotational rate measurement about its input axis. The on-board processor 54 receives these signals and processes the information therein to determine a roll angle of the body 51. The roll angle directly provides the local vertical direction, as described in more detail below.

Figure 3:
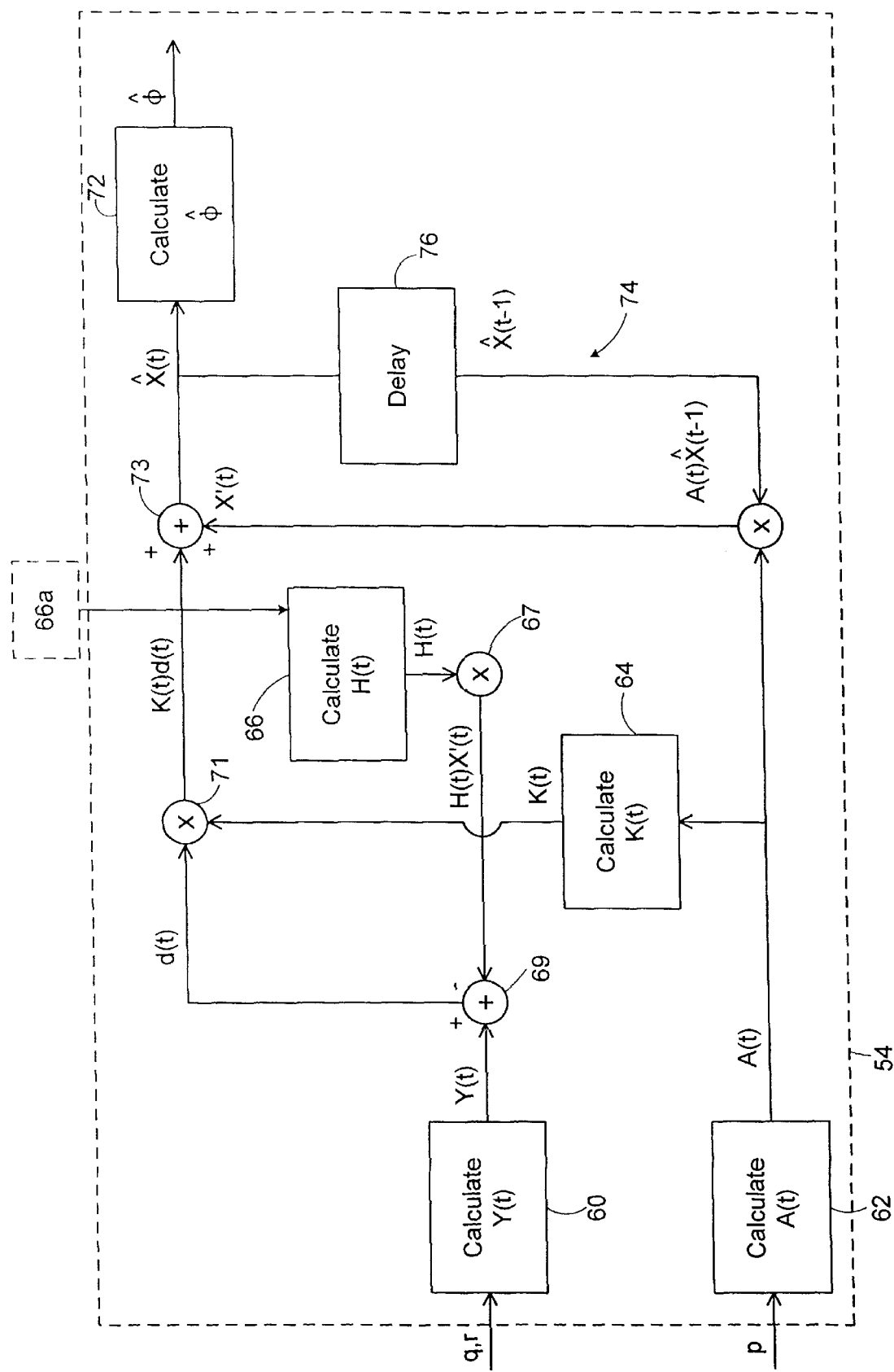
FIG. 3 illustrates a filter processing flow diagram of an on-board processor constructed according to the invention.

FIG. 3 shows additional detail of the on-board processor 54 of FIG. 2. The on-board processor 54 receives real-time rate information from each of the rate gyros 52a–52c. Specifically, rate gyro 52a provides roll rate "p" information, rate gyro 52b provides pitch rate "q" information, and rate gyro 52c provides yaw rate "r" information. Collectively, the total rotational rate vector formed by these respective rates is $$\begin{bmatrix} p \\ q \\ r \end{bmatrix}.$$

Data represented in the q, r rate signals are preferably pre-processed by the preprocessing section 60. The particular process functions undertaken within section 60 depend upon the particulars of the current flight scenario. However, typical functions of section 60 include summing, averaging, integration and the like. Those skilled in the art will appreciate that other preprocessing can be accomplished within section 60. Collectively, the post-processed signals of q and r are represented by the two-dimensional vector Y(t), which is functionally dependent upon time.

Signal p, representative of the current roll rate of the body 51, is similarly processed within the transition section 62, which generates a transition matrix A(t), also functionally dependent upon time. In the preferred embodiment of the invention, the transition matrix A(t) has the following form:

$$A(t) = \begin{bmatrix} \cos\Delta\phi & \sin\Delta\phi & 0 & 0 \\ -\sin\Delta\phi & \cos\Delta\phi & 0 & 0 \\ 0 & 0 & 1 & 0 \\ 0 & 0 & 0 & 1 \end{bmatrix}$$

where $$\Delta\Phi = \int p(t) dt.$$

The time for integration over the quantity $\Delta\Phi$ corresponds to the update rate of the on-board processor 54. Typical update rates are, for example, between about ten milliseconds and one hundred milliseconds; but could be as large as one second. Accordingly, the preprocessor section 60 not only provides filtering of the data q and r; but also provides the most reasonable estimate of measured pitch and yaw rates, q and r, at the time of the local vertical update.

Gain matrix section 64 generates a gain matrix K(t) that is applied to the difference between Y(t), corresponding to the pre-processed measurements of signals q and r, and the predicted measurement Y'(t), which corresponds to the multiplication between H(t) and the predicted state X'(t−1) Each of the states X'(t) and $\hat{X}$(t−1) are described in more detail below.

In the preferred embodiment of the invention, the gain matrix K(t) has the following form:

$$K(t) = P'(t)H^T(t)[H(t)P'(t)H(t)^T + R]^{-1}$$

where $$P'(t) = A(t)\hat{P}(t-1)A^T(t) + Q,$$

$$\hat{P}(t) = P'(t) - K(t)H(t)P'(t),$$

R is the measurement noise covariance matrix caused by errors in the pitch and yaw gyros, and Q is the process noise covariance matrix caused by roll gyro errors. Note that R and Q can additionally provide compensation for other operational artifacts such as aerodynamic disturbances, coning motion, and wind effects. That is, for example, if any of the yaw and pitch gyros, and operational artifacts cause undesirable and spurious rotations about the yaw and pitch axis, the magnitude of R increases so as to reduce the magnitude of the gain matrix K(t). Accordingly, the associated and estimated update to the local vertical direction will be de-emphasized for the current update or until the spurious rotations decrease.

Note also that P'(t) corresponds to the covariance matrix of the estimation errors prior to the on-board processor's incorporation of the current measurement, and that $\hat{P}(t)$ corresponds to the covariance matrix after the measurement is incorporated. These equations are then calculated recursively by the on-board processor to determine the gain matrix K(t).

In the above equations, H(t) has the following functional form:

$$H(t) = \begin{bmatrix} \dot{\gamma} & 0 & 1 & 0 \\ 0 & \dot{\gamma} & 0 & 1 \end{bmatrix}$$

where $\gamma$ is the gravity turn rate. The gravity turn rate $\gamma$ has the following functional form:

$$\dot{\gamma} = -\frac{g[\cos\gamma]}{V}$$

where g is the magnitude of gravitational acceleration, $\gamma$ is the flight path angle, and V is the speed of the body 51 along the trajectory flight path. The quantity "g" is a fixed physical constant, and the velocity V and flight angle $\gamma$ have the following functional relationships:

$$V = \sqrt{\dot{X}_E 2 + \dot{Y}_E 2 + \dot{Z}_E 2}$$

$$\sin\gamma = \dot{Y}_E/V$$

The gravity turn rate, $\gamma$, may be calculated in real-time, or it may be pre-stored within the on-board processor to approximate the generally-known apriori flight path. Accordingly, the on-board processor can operate in two modes: a known gravity turn mode, and an unknown gravity turn mode.

In order to calculate the gravity turn rate in real-time, i.e., in the on-board processor's known gravity turn mode, on-board accelerometers can be used to determine the speed, |V|, of the body, as well as the flight angle $\gamma$, such as known to those skilled in the art. In the unknown gravity turn mode, on the other hand, the speed and flight angles of the body, during flight, may be approximate from the apriori knowledge of the planned flight trajectory. As such, the gravity turn rate $\gamma$ can be precalculated and stored in internal memory, e.g., the memory indicated by outline 54a, FIG. 2.

In FIG. 3, gravity rate section 66 calculates the matrix H(t). As discussed above, the calculation of $\gamma$ can be made with prestored flight path information in the processor 54; or through direct input from external sensors, here illustrated as accelerometers 66a. Matrix H(t) is multiplied by the predicted state X'(t), defined below, at point 67. The combined matrix H(t)X'(t) is what the on-board processor predicts the rates q and r are; and that combined vector is then subtracted at point 69 from the preprocessed vector Y(t) of signals q and r so that a measurement residual d(t) is determined. By way of example, if the vector d(t) is zero, then the next local vertical direction is not updated by the processor's estimations; and the next local vertical direction is determined solely on the past measured state $\hat{X}$(t−1) and the transition matrix $\hat{A}$(t).

The residual d(t) is then multiplied with the gain matrix K(t), at point 71, to define a correction vector K(t)d(t). That correction vector is added, at point 73, to the predicted state X'(t) to define the estimated state $\hat{X}(t)$ used by section 72 to determine local vertical direction, i.e., the roll angle Φ.

The feedback portion 74 illustrates that the prior state information from the previous updates is used within subsequent updates. Therefore, delay section 76 provides a storage medium to store the information $\hat{X}(t-1)$ from the last update, i.e., at time (t−1); and that state information is multiplied by the transition matrix A(t) to generate the predicted state X'(t).

The system as thus described provides local vertical direction, corresponding to the body's roll angle in local body coordinates (i.e., that angle which the body 51 would have to rotate in order to align with the local vertical plane, defined by the body's velocity vector and the vector corresponding to earth's gravitation). The filtering processed through the on-board processor is preferably a Kalman-filter that estimates the following four states:

$$X = \begin{bmatrix} \sin\phi \\ \cos\phi \\ q_{bias} \\ r_{bias} \end{bmatrix}$$

where X is the true state and where X' and $\hat{X}$ are the estimated states. The third and fourth states correspond to the bias functions $q_{bias}$ and $r_{bias}$, which are the respective biases of the yaw and pitch gyros. Note, for example, that the measured pitch rate, $q_{measured}$ can be modeled here as $(q_{true}+q_{bias}+e)$, where e is any residual error, and where $q_{true}$ equals γsinΦ. The prediction error, e', thus correspond to X'−X; and the error after measurement incorporation, ê, corresponds to $\hat{X}$−X.

Further useful background of the estimations within the on-board processor 54 are found within D. Gustafson et al., *Autonomous Local Vertical Determination for Guided Artillery Shells*, ION 52nd Annual Meeting, June 19–21 (1996), which is hereby incorporated by reference and which is attached hereto as Appendix A, pages A1–A9.

The invention thus attains the objects set forth above, among those apparent from preceding description. Since certain changes may be made in the above apparatus and methods without departing from the scope of the invention, it is intended that all matter contained in the above description or shown in the accompanying drawing be interpreted as illustrative and not in a limiting sense.

For example, those skilled in the art should appreciate that the equations discussed herein are practical approximations to complex integrals of guidance equations; and that other simplifications are described herein which should not alter the scope of the invention. The invention can also be used to navigate objects traveling near-ballistic paths.

It is also to be understood that the following claims are to cover all generic and specific features of the invention described herein, and all statements of the scope of the invention which, as a matter of language, might be said to fall there between.

Having described the invention, what is claimed as new and secured by Letters Patent is:

1. Autonomous navigation apparatus for determining the local vertical direction of a ballistic body of the type having a body spin axis, comprising:
   (A) a roll gyro, a yaw gyro and a pitch gyro, each gyro being rigidly fixed to the ballistic body and being responsive to a rate about an input axis that is substantially orthogonal to any other gyro, the roll-rate gyro having its input axis aligned parallel to the body spin axis; and
   (B) an on-board processor having means for determining the local vertical direction from the gyros.

2. Autonomous navigation apparatus according to claim 1, wherein at least one of the gyros is a micromechanical gyro.

3. Autonomous navigation apparatus according to claim 1, wherein the on-board processor comprises means for determining gravity turn information based upon rate information from each gyro.

4. Autonomous navigation apparatus according to claim 1, further comprising means for determining roll angle from the gyros.

5. Autonomous navigation apparatus according to claim 1, wherein the on-board processor comprises means for determining a total measured rotational rate vector in body coordinates.

6. Autonomous navigation apparatus according to claim 1, wherein the on-board processor comprises means for extracting gravity turn information from a total measured velocity vector in body coordinates.

7. Autonomous navigation apparatus according to claim 1, wherein the on-board processor comprises filter means for improving roll angle accuracy by filtering spurious rotations generated by aerodynamics effects.

8. Autonomous navigation apparatus according to claim 1, wherein each gyro generates a signal indicative of a roll rate about its input axis, and wherein the on-board processor comprises filter means for improving roll angle accuracy by filtering errors within the signals.

9. Autonomous navigation apparatus according to claim 1, wherein the on-board processor comprises storage means for storing at least one estimation algorithms used in determining the roll angle.

10. Autonomous navigation apparatus according to claim 1, wherein the on-board processor comprises filter means for recursively estimating the roll angle in body coordinates.

11. Autonomous navigation apparatus according to claim 10, wherein the filter means comprises a Kalman filter.

12. Autonomous navigation apparatus according to claim 10, further comprising means for estimating a plurality of states indicative of the roll angle.

13. Autonomous navigation apparatus according to claim 12, wherein the on-board processor comprises means for determining first and second states from the roll gyro, the first state being representative of the sine of a body roll angle relative to a local vertical plane, the second state being representative of a cosine of the body roll angle relative to the local vertical plane.

14. Autonomous navigation apparatus according to claim 13, wherein the pitch gyro is constructed and arranged to generate a pitch output signal that is substantially proportional to gravity turn rate and the first state.

15. Autonomous navigation apparatus according to claim 13, wherein the yaw gyro is constructed and arranged to generate a yaw output signal that is substantially proportional to gravity turn rate and the second state.

16. Autonomous navigation apparatus according to claim 12, wherein the on-board processor comprises means for (I) determining a third state from a first bias of the pitch gyro, and for (ii) determining a fourth state from a second bias of the yaw gyro.

17. Autonomous navigation apparatus according to claim 16, wherein the on-board processor comprises means for estimating the third and fourth states from a non-zero spin rate about the body spin axis.

18. Autonomous navigation apparatus according to claim 16, wherein the on-board processor comprises means for substantially neglecting the third and fourth states for substantially zero spin rates about the body spin axis.

19. Autonomous navigation apparatus according to claim 10, wherein the filter means comprises means for de-emphasizing bias states as a roll rate about the body spin axis approaches zero.

20. Autonomous navigation apparatus according to claim 10, wherein the filter means comprises means for operating in one of the following modes: a known gravity turn rate mode and an unknown gravity turn rate mode.

21. A method for determining the roll angle of a ballistic body of the type having a body spin axis, comprising the steps of:

sensing roll, yaw and pitch rates of the body, the roll rate corresponding to rotation about the body spin axis at a measurement time;

recursively estimating a current gain matrix based upon (a) a covariance of state estimation errors prior to the measurement time, and (b) a covariance of state estimation errors after the measurement time; and applying the current gain matrix to a measurement residual to determine the local vertical direction.

22. A method according to claim 21, further comprising the step of calculating a transition matrix A(t) having the functional form of:

$$A(t) = \begin{bmatrix} \cos\Delta\phi & \sin\Delta\phi & 0 & 0 \\ -\sin\Delta\phi & \cos\Delta\phi & 0 & 0 \\ 0 & 0 & 1 & 0 \\ 0 & 0 & 0 & 1 \end{bmatrix}$$

where $\gamma\Phi$ corresponds to an integral of the roll rate over a predetermined time.

23. A method according to claim 22, further comprising the steps of multiplying the transition matrix by a prior state estimate to form a predicted state, and adding the predicted state to a correction vector formed by multiplying the measurement residual by the current gain matrix.

24. A method according to claim 21, further comprising the step of preprocessing signal data corresponding to the pitch and yaw rates.

25. A method according to claim 21, further comprising the step of determining a gravity turn rate by one of: (a) calculating velocity and flight angle through prestored trajectory information; and (b) calculating velocity and flight angle by processing accelerometer information.

* * * * *